(12) United States Patent
Takashi et al.

(10) Patent No.: US 11,493,068 B2
(45) Date of Patent: Nov. 8, 2022

(54) JOINT STRUCTURE

(71) Applicant: TOYOTA JIDOSHA KABUSHIKI KAISHA, Toyota (JP)

(72) Inventors: Toshinobu Takashi, Nisshin (JP); Kohei Takahashi, Nisshin (JP); Yasuhide Matsuo, Toyota (JP); Ayaka Kagami, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 908 days.

(21) Appl. No.: 16/205,842

(22) Filed: Nov. 30, 2018

(65) Prior Publication Data

US 2019/0178271 A1 Jun. 13, 2019

(30) Foreign Application Priority Data

Dec. 8, 2017 (JP) .............................. JP2017-236494

(51) Int. Cl.
*F16B 5/00* (2006.01)
*B62D 27/02* (2006.01)

(52) U.S. Cl.
CPC ............ *F16B 5/0096* (2013.01); *B62D 27/02* (2013.01); *Y10T 403/4991* (2015.01)

(58) Field of Classification Search
CPC .......... F16B 5/0096; F16B 5/04; F16B 5/045; B21D 39/031; B21D 39/32; B21D 39/032; Y10T 403/49; Y10T 403/4966; Y10T 403/4991; Y10T 29/49833; Y10T 29/49835; B26C 65/60; B62D 29/048; B62D 27/023

USPC ....................................................... 296/191, 29
See application file for complete search history.

(56) References Cited

U.S. PATENT DOCUMENTS

| 430,000 | A | * | 6/1890 | Clark | .................... | B21D 39/021 |
| | | | | | | 29/509 |
| 3,163,931 | A | * | 1/1965 | Nielsen | ................ | B21D 39/035 |
| | | | | | | 29/509 |
| 3,579,809 | A | * | 5/1971 | Wolf | ........................ | F16B 5/045 |
| | | | | | | 29/509 |
| 3,728,779 | A | * | 4/1973 | Behlen | ...................... | F16B 5/07 |
| | | | | | | 29/432 |

(Continued)

FOREIGN PATENT DOCUMENTS

| DE | 4431849 A1 | * | 3/1996 | ........... B21D 39/031 |
| FR | 3 028 194 A1 | | 5/2016 | |

(Continued)

OTHER PUBLICATIONS

Russian Federation Office Action dated Jul. 4, 2019 in Patent Application No. 2018142508/02(070861) (with English translation), 6 pages.

*Primary Examiner* — Matthew R McMahon
(74) *Attorney, Agent, or Firm* — Oblon, McClelland, Maier & Neustadt, L.L.P.

(57) ABSTRACT

A joint structure comprises a first panel and a second panel joined together by mechanical clinching. The joint structure includes a join region that is formed so as to extend in an elongated shape by forming plural clinched portions in a given arrangement by mechanical clinching. At least one clinched portion of the plural clinched portions is clinched from an opposite panel side from other clinched portions of the plurality of clinched portions.

6 Claims, 12 Drawing Sheets

(56) References Cited

U.S. PATENT DOCUMENTS

| | | | | |
|---|---|---|---|---|
| 6,139,974 | A * | 10/2000 | Atkinson | B21D 13/04 |
| | | | | 29/521 |
| 6,835,020 | B2 * | 12/2004 | Wang | B21J 15/025 |
| | | | | 403/278 |
| 7,121,002 | B1 * | 10/2006 | Roth | B21D 39/031 |
| | | | | 29/890.039 |
| 8,763,233 | B2 * | 7/2014 | Bartig | F16B 19/086 |
| | | | | 411/501 |
| 9,249,816 | B2 * | 2/2016 | Scott | B32B 15/016 |
| 9,573,186 | B2 * | 2/2017 | Freis | B21J 15/025 |
| 10,384,296 | B2 * | 8/2019 | Spinella | B23K 11/18 |
| 2004/0232591 | A1 * | 11/2004 | Dajek | B29C 45/14467 |
| | | | | 264/259 |
| 2010/0018148 | A1 | 1/2010 | Trojer et al. | |
| 2012/0177459 | A1 * | 7/2012 | Carlsson | F16B 5/06 |
| | | | | 411/80.5 |
| 2015/0217821 | A1 * | 8/2015 | Campbell | B23K 11/115 |
| | | | | 29/428 |
| 2015/0375795 | A1 * | 12/2015 | Freis | B21J 15/36 |
| | | | | 296/191 |
| 2016/0115986 | A1 * | 4/2016 | Freis | F16B 19/086 |
| | | | | 411/502 |
| 2019/0135351 | A1 * | 5/2019 | Kagami | B62D 27/023 |

FOREIGN PATENT DOCUMENTS

| | | | | |
|---|---|---|---|---|
| FR | 3028194 | A1 * | 5/2016 | ............ B62D 65/02 |
| GB | 910157 | A | 11/1962 | |
| JP | 2006-523550 | A | 10/2006 | |
| JP | 2010-518336 | A | 5/2010 | |
| JP | 2014-24475 | | 2/2014 | |
| JP | 2015-189427 | | 11/2015 | |
| JP | 2016-112594 | A | 6/2016 | |
| SU | 1735627 | A1 | 5/1992 | |

* cited by examiner

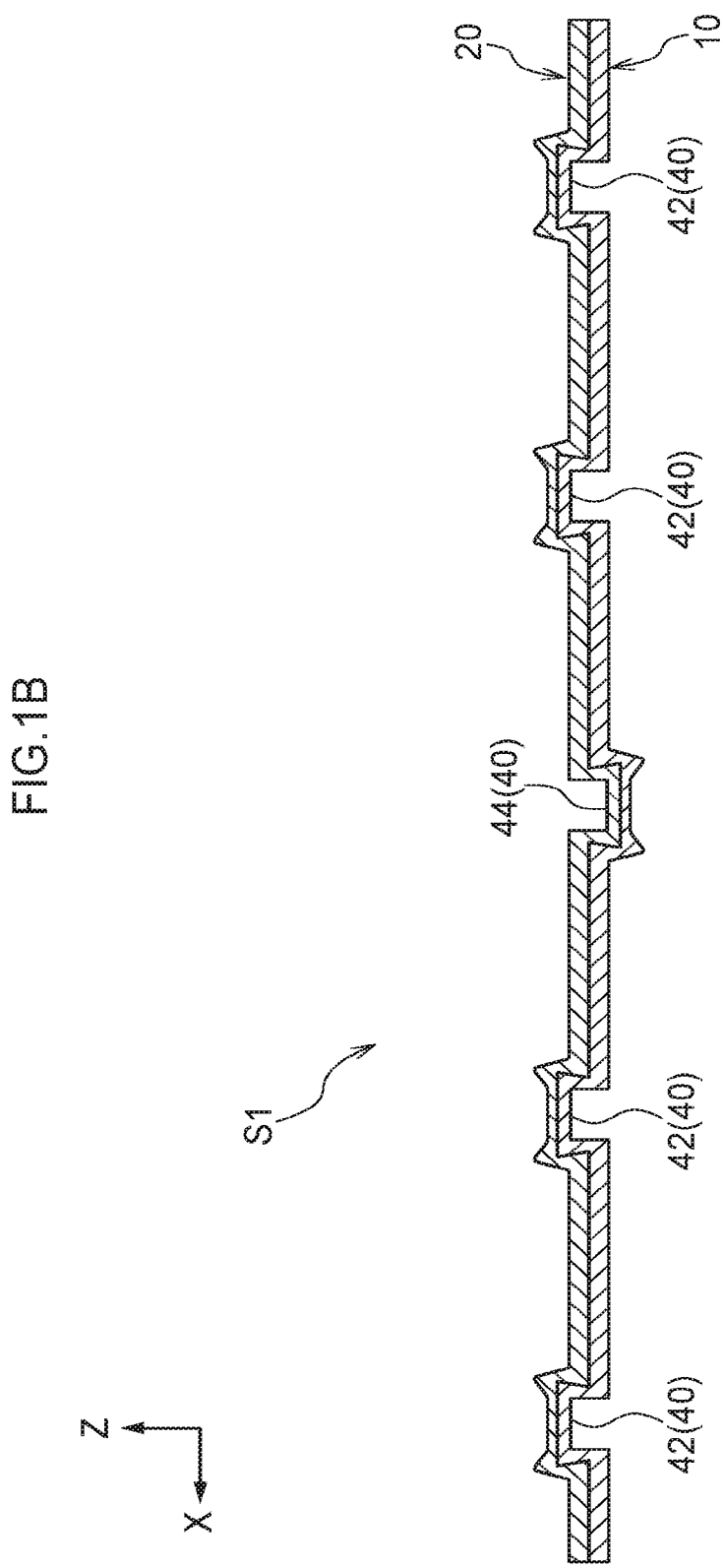

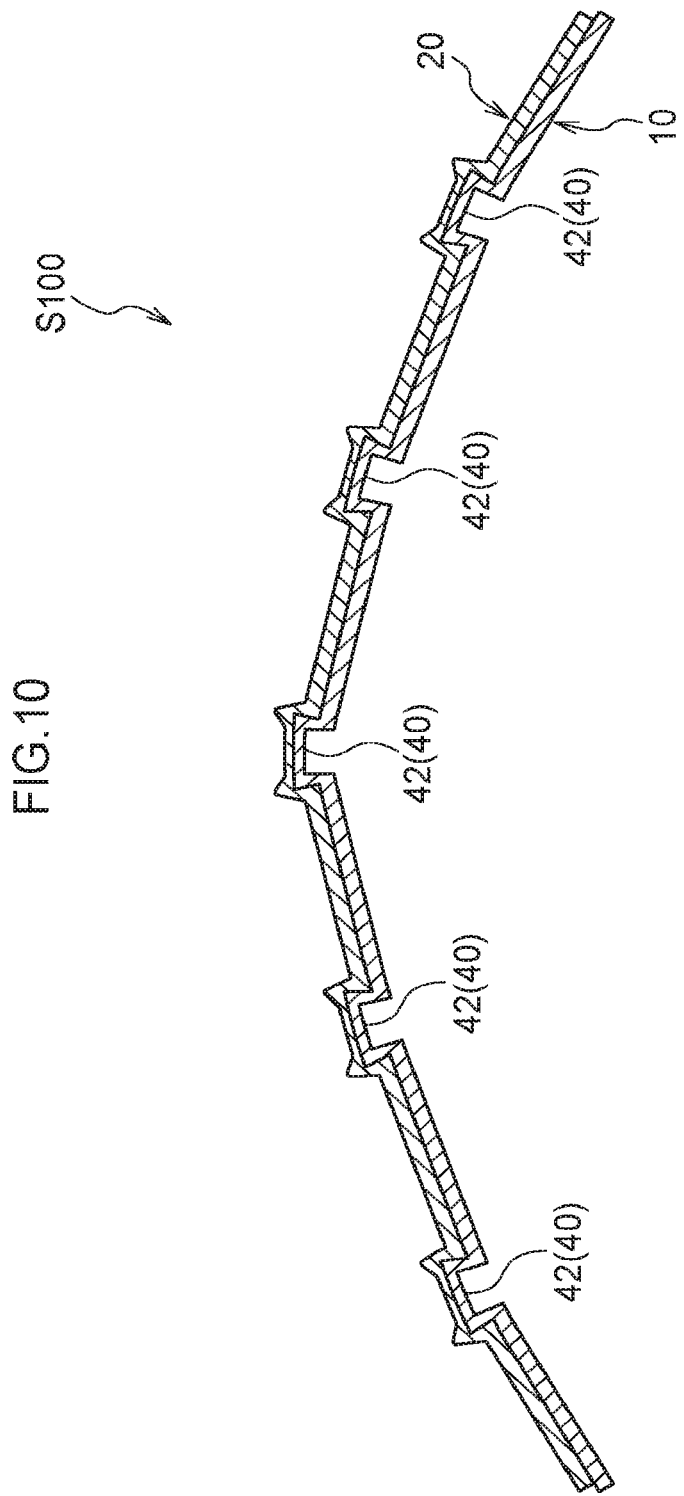

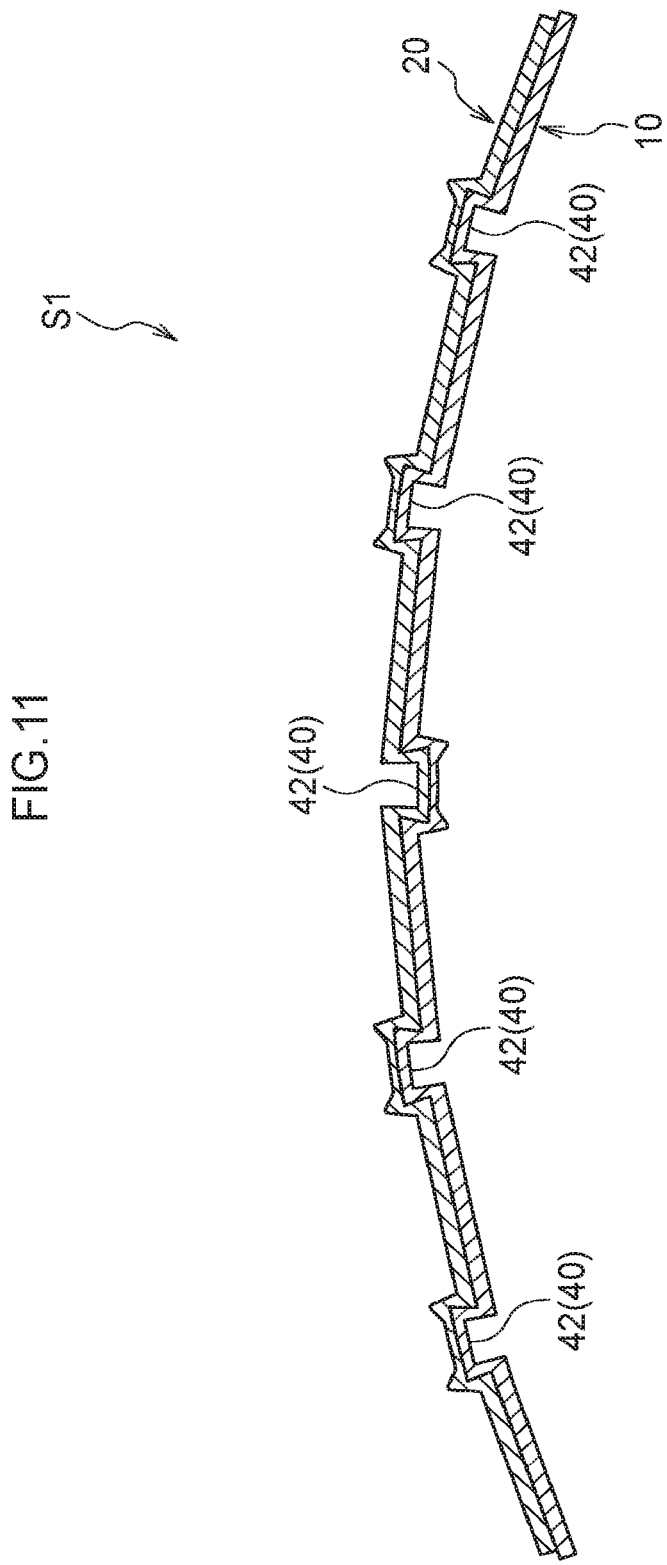

JOINT STRUCTURE

CROSS-REFERENCE TO RELATED APPLICATION

This application claims priority under 35 USC 119 from Japanese Patent application No. 2017-236494 filed on Dec. 8, 2017, the disclosure of which is incorporated by reference herein in its entirety.

BACKGROUND

Technical Field

The present disclosure relates to a joint structure.

Related Art

Japanese Patent Application Laid-Open (JP-A) No. 2015-189427 discloses a vehicle manufactured using joining by mechanical clinching.

However, in cases in which joining is performed by mechanical clinching, a force pulling toward the center of the join point is stronger on a panel at a punch side than on a panel at a die side. Thus, as illustrated in FIG. 9, warping toward the punch side occurs at the surroundings of the join point (specifically, warping with a substantially spherical face shape having a sphere center at an imaginary point at the punch side of the panel).

Furthermore, in cases in which plural join points are formed by being mechanically clinched so as to be arranged in a row in an elongate join region, as in the structure described in JP-A No. 2015-189427, warping at the surroundings of the join points is cumulative along the length direction of the join region, such that there is a possibility of significant warping of a member. As a result, there are concerns regarding deterioration of manufacturing precision.

SUMMARY

The present disclosure has been arrived at in consideration of the above circumstances. Namely, the present disclosure provides a joint structure capable of reducing warping of a member in cases in which plural join points (clinched portions) are formed by mechanically clinching so as to be arranged in a row in an elongated shaped join region.

A joint structure according to a first aspect is a joint structure in which a first panel and a second panel are joined together by mechanical clinching. The joint structure includes a join region that is formed so as to extend in an elongated shape by forming plural clinched portions in a given arrangement by mechanical clinching. At least one clinched portion of the plural clinched portions is clinched from an opposite panel side from other clinched portions of the plural clinched portions.

In the joint structure according to the first aspect, the first panel and the second panel are joined together by mechanical clinching. The plural clinched portions are formed in a given arrangement by mechanical clinching, and the join region is formed so as to extend in an elongated shape by the plural clinched portions.

Moreover, in the joint structure according to the first aspect, at least one clinched portion of the plural clinched portions formed in the join region extending in an elongated shape is clinched from an opposite panel side from other clinched portions of the plural clinched portions.

Thus warping is generated at the at least one clinched portion clinched from the opposite panel side that is warping in the opposite direction to that at the other clinched portions. Warping generated by the other clinched portions is thereby cancelled out by the clinched portion clinched from the opposite panel side. This enables warping of a member (a member obtained by joining) to be reduced.

A joint structure according to a second aspect is the joint structure according to the first aspect, wherein the join region is a region extending along an outer edge of an overlap region, this being a region where the first panel and the second panel overlap with each other.

In the joint structure according to the second aspect, the join region is the region extending along the outer edge of the overlap region, this being the region where the first panel and the second panel overlap with each other. This enables a deterioration in the styling at the outer edge of the overlap region to be suppressed.

Note that "extending along the outer edge" means that an imaginary line linking together centers of the plural clinched portions and an outer edge of the overlap region extend substantially parallel to each other, with a distance between the imaginary line and the outer edge of the overlap region being a distance of not more than 2.5 times a diameter of the clinched portions.

A joint structure according to a third aspect is the joint structure according to the first aspect or the second aspect, wherein the overlap region at which the first panel and the second panel overlap with each other extends in an elongated shape, and the join region is formed along a length direction of the overlap region.

In the joint structure according to the third aspect, the join region is formed in an elongated shape along the overlap region formed extending in an elongated shape. This is accordingly well suited, for example, to cases in which the elongated shaped overlap region is formed and joined together by overlapping an end portion of the first panel and an end portion of the second panel.

A joint structure according to a fourth aspect is the joint structure according to any one of the first to the third aspects, wherein the join region extends in a straight line.

In the joint structure according to the fourth aspect, the join region extends in a straight line. This enables the suppression of a large cumulative warping from occurring along the region extending in a straight line.

A joint structure according to a fifth aspect is the joint structure according to any one of the first to the fourth aspects, wherein the first panel is configured by a material with a higher Young's Modulus than the second panel, and among plural clinched portions, a number of portions clinched from a first panel side is greater than a number of portions clinched from a second panel side.

In cases in which there is a difference in the Young's Moduli of the materials configuring two panels to be joined (the first panel and the second panel), a higher join strength is achieved at the clinched portion by clinching from the panel side with the higher Young's Modulus than by clinching from the panel side with the lower Young's Modulus.

Thus in the joint structure according to the fifth aspect, from out of the plural clinched portions, the number of portions clinched from the first panel side configured by material with a comparatively high Young's Modulus is greater than the number of portions clinched from the second panel side. This enables a higher join strength to be achieved in the join region compared to cases in which the number of portions clinched from the first panel side is the same as or lower than the number of portions clinched from the second panel side. This enables a joint structure to be realized that is well suited to locations where a high join strength is required.

A joint structure according to a sixth aspect is the joint structure of any one of the first to the fourth aspects, wherein the first panel is configured by a material with a higher Young's Modulus than the second panel, and among the plural clinched portions, a number of portions clinched from a first panel side is no less than 60% of a total number of the plural clinched portions.

In the joint structure according to the sixth aspect, the number of portions clinched from the first panel side configured by the material with a comparatively high Young's Modulus from out of the plural clinched portions is not less than 60% of the total number of the plural clinched portions. This enables a joint structure to be realized that is even better suited to locations where a high join strength is required.

A joint structure according to a seventh aspect is the joint structure according to any one of the first to the fourth aspects, wherein the first panel is configured by a material with a higher Young's Modulus than the second panel, and among the plural clinched portions, a number of portions clinched from a first panel side is lower than a number of portions clinched from a second panel side.

In cases in which there is a difference in the Young's Moduli of the materials configuring two panels to be joined (the first panel and the second panel), warping is greater at clinched portions (join points) clinched from the panel side with the higher Young's Modulus than at those clinched from the panel side with the lower Young's Modulus.

In the joint structure according to the sixth aspect, from out of the plural clinched portions, the number of portions clinched from the side of the first panel configured by the material with a comparatively high Young's Modulus is lower than the number of portions clinched from the second panel side. This enables warping of a member to be reduced compared to cases in which the number of portions clinched from the first panel side is the same as or more than the number of portions clinched from the second panel side. This enables a joint structure to be realized that is suited to locations where high manufacturing precision is required.

A joint structure according to an eighth aspect is a joint structure according to any one of the first to the fourth aspects, wherein the first panel is configured by a material with a higher Young's Modulus than the second panel, and among the plural clinched portions, s number of portions clinched from a first panel side is no more than 40% of a total number of the plural clinched portions.

In the joint structure according to the eighth aspect, from out of the plural clinched portions, the number of portions clinched from the side of the first panel configured by the material with a comparatively high Young's Modulus is not more than 40% of the total number of the plural clinched portions. This enables a joint structure to be realized that is even better suited to locations where high manufacturing precision is required.

A joint structure according to a ninth aspect is a joint structure according to any one of the first to the eighth aspects, wherein the join region includes an alternating region at which five or more clinched portions consecutively arranged along a length direction of the join region are clinched in alternate directions.

Setting alternate directions for clinching is an effective method to reduce cumulative warping in the length direction of a join region due to adjacent warping cancelling each other out.

In the joint structure according to the ninth aspect, the join region is configured including the alternating region where five or more clinched portions consecutively arranged in a row along the length direction of the join region are clinched in alternate directions. Warping of a member is therefore particularly suppressed at the alternating region of the join region.

Note that the number of clinched portions consecutively arranged in a row in the alternating region is preferably seven or more from the perspective of lengthening the region where warping is reduced, and is more preferably nine or more.

A joint structure according to a tenth aspect is the joint structure according to the ninth aspect, wherein the join region is configured by the alternating region alone.

In the joint structure according to the tenth aspect, the join region is configured by the alternating region alone. Namely, all of the clinched portions included in the join region are clinched portions consecutively arranged in a row along the length direction of the join region that are clinched in alternate directions. This enables an effective reduction in warping of a member to be achieved over the entire join region.

A joint structure according to an eleventh aspect is the joint structure according to any one of the first to the tenth aspects, wherein among the plural clinched portions, the number of portions clinched from the first panel side is greater than the number of portions clinched from the second panel side, respective length direction ends of the join region are either both free ends or both fixed ends, a clinched portion clinched from the second panel side is present in a central region of the join region. The central region is a region centered on a length direction center of the join region and consisting of 33% of the join region.

In the joint structure according to the eleventh aspect, both the length direction ends of the join region are either both free ends or both fixed ends. In such cases, inverting the clinched portion in the vicinity of the length direction center of the join region is highly effective in reducing warping.

In the joint structure according to the eleventh aspect, the number of portions clinched from the first panel side from out of the plural clinched portions is greater than the number of portions clinched from the second panel side, and the clinched portion clinched from the second panel side is present in the central region of the join region.

This enables warping of a member to be effectively reduced in cases in which it is desirable to have a large proportion of clinched portions clinched from the first panel side among the plural clinched portions (such as, for example, cases in which it is desirable to increase the join strength when the first panel is configured by a material with a comparatively high Young's Modulus).

A joint structure according to a twelfth aspect is the joint structure according to the eleventh aspect, wherein the first panel is configured by a material with a higher Young's Modulus than the second panel, and only clinched portions clinched from the first panel side are present in regions of the join region other than the central region.

In the joint structure according to the twelfth aspect, the joint structure according to the eleventh aspect has the first panel configured by the material with a higher Young's Modulus that that of the second panel. This enables the join strength of the join region to be increased. Moreover, only clinched portions clinched from the first panel side are present in regions of the join region excluding the central region, enabling the proportion of clinched portions that are clinched from the first panel side from out of the plural clinched portions to be increased. This enables a joint structure to be realized that is even better suited to locations where a high join strength is required.

A joint structure according to a thirteenth aspect is the joint structure according to any one of the first to the tenth aspects, wherein among the plural clinched portions, the number of portions clinched is greater than the number of portions clinched from the second panel side, one length direction side of the join region is a fixed end and another length direction side of the join region is a free end, and a clinched portion clinched from the second panel side is present in a fixed end region of the join region. The fixed end region is a region consisting of 33% of the join region and extending from a fixed end side end portion of the join region along a length direction of the join region.

In the joint structure according to the thirteenth aspect, the one length direction side of the join region is a fixed end and the other length direction side of the join region is a free end. In such cases, inverting the clinched portion in the vicinity of the fixed end side end portion of the join region is highly effective in reducing warping.

In the joint structure according to the thirteenth aspect, the number of portions clinched from the first panel side from out of the plural clinched portions is greater than the number of portions clinched from the second panel side. Moreover, the clinched portion clinched from the second panel side is present in the fixed end region of the join region.

This enables warping of a member to be effectively reduced in cases in which it is desirable to have a large proportion of clinched portions clinched from the first panel side among the plural clinched portions (such as, for example, cases in which it is desirable to increase the join strength when the first panel is configured by a material with a comparatively high Young's Modulus).

A joint structure according to a fourteenth aspect is the joint structure according to the thirteenth aspect, wherein the first panel is configured by a material with a higher Young's Modulus than the second panel, and only clinched portions that are clinched from the first panel side are present in regions of the join region other than the fixed end region.

In the joint structure according to the fourteenth aspect, the joint structure according to the thirteenth aspect has the first panel configured by a material with a higher Young's Modulus than that of the second panel. This enables the join strength of the join region to be increased. Moreover, only the clinched portions clinched from the first panel side are present in regions of the join region excluding the fixed end region. This enables the proportion of clinched portions that are clinched from the first panel side from out of the plural clinched portions to be increased. This enables a joint structure to be realized that is even better suited to locations where a high join strength is required.

Advantageous Effects of Invention

As explained above, the present disclosure enables warping of a member to be reduced in cases in which plural join points (clinched portions) are formed by mechanical clinching in a row along an elongated shaped join region.

BRIEF DESCRIPTION OF THE DRAWINGS

FIG. 1B is a cross-section along line 1B-1B in FIG. 1A;
FIG. 10 is a cross-section illustrating a joint structure of a comparative example, emphasizing warping therein;
and
FIG. 11 is a cross-section illustrating a joint structure of the first exemplary embodiment, emphasizing warping therein.

DETAILED DESCRIPTION

First Exemplary Embodiment

Figure 1A:
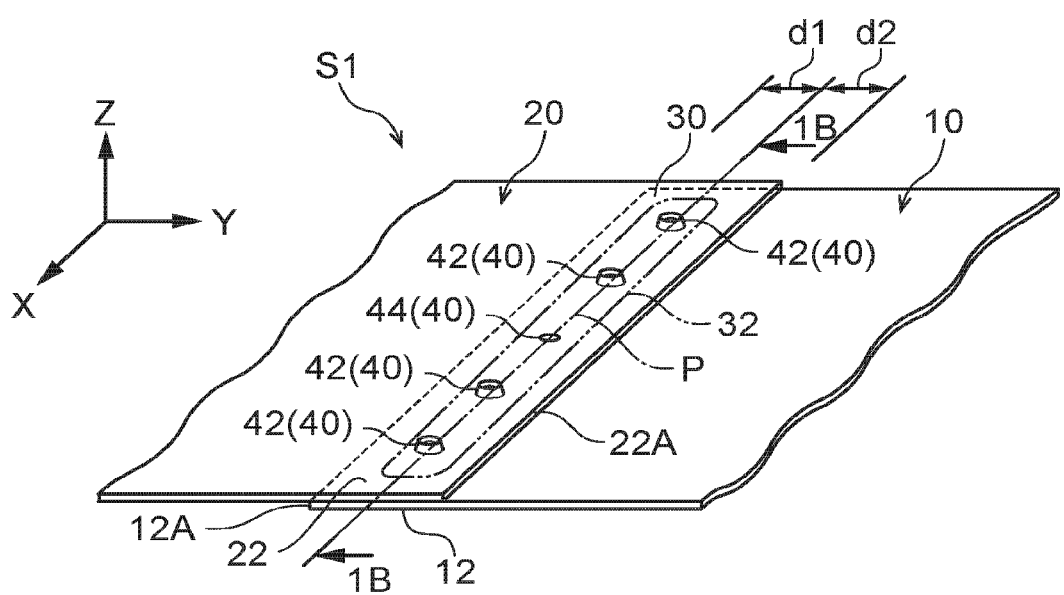
FIG. 1A is a perspective view illustrating a joint structure of a first exemplary embodiment.

Explanation first follows regarding a (vehicle) joint structure S1 of a first exemplary embodiment illustrated in FIG. 1A and FIG. 1B.

The joint structure S1 includes a first panel 10 and a second panel 20. The first panel 10 is a ferrous (steel) plate member, and the second panel 20 is an aluminum (aluminum alloy) plate member. The first panel 10 is thereby configured by a material with a higher Young's Modulus than that of the second panel 20.

An end portion 12 (a left end portion in FIG. 1A) of the first panel 10 and an end portion 22 (a right end portion in FIG. 1A) of the second panel 20 overlap with each other to form an overlap region 30, this being a region where the first panel 10 and the second panel 20 overlap each other. The overlap region 30 is a rectangular shaped region that is long in the X direction in the drawings, and is an elongated shaped region with its length direction along the X direction in the drawings.

Plural (five in the drawings) clinched portions 40 are formed in the overlap region 30. The plural clinched portions 40 are formed so as to be arranged in a row in a direction lying along the length direction of the overlap region (the X direction). Spacings between the plural clinched portions 40 are substantially uniform spacings. The clinched portions 40 are clinched portions 40 formed by joining by mechanical TOX (registered trademark) clinching or the like. A join region 32 (a region surrounded by a double-dotted dashed line 32) with its length direction along the X direction is formed by the plural clinched portions 40. An imaginary line linking together the centers of the plural clinched portions 40 (matching the cross-section line 1B-1B in FIG. 1A) is oriented in a direction along the length direction of the overlap region 30 (the X direction). The imaginary line is a straight line. Namely, in the present exemplary embodiment, the join region 32 is formed along the length direction of the overlap region 30.

As illustrated in FIG. 1A and FIG. 1B, four clinched portions 42 out of the five clinched portions 40 are clinched from the first panel 10 side, with each of the four clinched portions 42 having a recessed shape on the first panel 10 side. The one remaining clinched portion 44 is clinched from the second panel 20 side, and has a recessed shaped on the second panel 20 side. From out of the clinched portions 42 and the clinched portion 44 that are clinched from different directions, the greater number of clinched portions 40 are referred to as "standard clinched portions 42", and the fewer number of clinched portions 40 are referred to as "reverse clinched portions 44". Thus, at least one clinched portion (the reverse clinched portion 44) out of the plural clinched portions 40 formed in the join region 32 is clinched from the second panel 20 side, i.e. the opposite panel side to that of the other clinched portions (the standard clinched portions 42) out of the plural clinched portions 40.

To explain more specifically, the clinched portion 40 at the center of the five clinched portions 40 formed so as to be arranged in a row along the length direction of the join region 32 is configured by the reverse clinched portion 44, and the other clinched portions 40 are configured by the standard clinched portions 42.

The diameter of each clinched portion 40 (maximum diameter of a punch) is approximately 8 mm. A distance (distance in the Y direction in the drawings) d1 between an imaginary line P linking the centers of the plural clinched portions 40 (see FIG. 1A) and a plate edge 12A of the first panel 10 is approximately 10 mm to 15 mm. A distance (distance in the Y direction in the drawings) d2 between the imaginary line P and a plate edge 22A of the second panel 20 is also approximately 10 mm to 15 mm. The join region 32 is thereby a region that extends along outer edges of the overlap region 30.

Operation and Advantageous Effects

Explanation follows regarding operation and advantageous effects of the present exemplary embodiment.

In the present exemplary embodiment, the first panel 10 and the second panel 20 are joined together by mechanical clinching. The plural clinched portions 40 are formed by the mechanical clinching so as to be arranged in a row, and the join region 32 formed by the plural clinched portions 40 extends in an elongated shape.

Moreover, in the present exemplary embodiment, at least one clinched portion (the one reverse clinched portion 44), out of the plural clinched portions 40 formed in the join region 32 extending in an elongated shape, is clinched from the opposite panel side (i.e. from the second panel 20 side) to the other plural clinched portions 40 (the four standard clinched portions 42).

Thus, warping is accordingly generated at the at least one clinched portion 44 clinched from the opposite panel side that is warping in the opposite direction to warping of the other clinched portions 42. Warping generated by the other clinched portions 42 is thereby cancelled out by the clinched portion 44 clinched from the opposite panel side. This enables warping of a member (a member obtained by joining) illustrated in FIG. 11 to be reduced compared to a joint structure S100 of a comparative example (see FIG. 10) in which all the plural clinched portions 40 are clinched from the same first panel 10 side.

In the present exemplary embodiment, the join region 32 is a region extending along the outer edges of the overlap region 30, this being a region where the first panel 10 and the second panel 20 overlap. This enables a deterioration in the styling at the outer edges of the overlap region 30 to be suppressed.

In the present exemplary embodiment, the join region 32 is formed along the elongated shaped overlap region 30, and so is well suited to cases of joining the elongated shaped overlap region 30 formed by overlapping the end portion 12 of the first panel 10 and the end portion 22 of the second panel 20.

In the present exemplary embodiment, the join region 32 is a region extending in a straight line. This enables the suppression of a large cumulative warping from occurring along the region extending in a straight line.

In the present exemplary embodiment, the first panel 10 is configured by a material with a higher Young's Modulus than that of the second panel 20. In cases in which there is a difference in Young's Modulus between materials configuring two panels to be joined together (the first panel 10 and the second panel 20), a higher join strength is achieved at the clinched portion by clinching from the panel side with the higher Young's Modulus than by clinching from the panel side with the lower Young's Modulus.

Thus, of the plural clinched portions 40 in the present exemplary embodiment, the number of portions clinched from the first panel 10 side configured by material with a comparatively high Young's Modulus is greater than the number of portions clinched from the second panel 20 side.

This enables a higher join strength to be achieved in the join region 32 compared to cases in which the number of portions clinched from the first panel 10 side is the same as or lower than the number of portions clinched from the second panel 20 side. This enables a joint structure to be realized that is well suited to locations where a high join strength is required.

Moreover, from out of the plural clinched portions 40 in the present exemplary embodiment, the number of portions clinched from the first panel 10 side configured by material with a comparatively high Young's Modulus is not less than 80% of the total number of plural clinched portions 40. This enables a joint structure to be realized that is even better suited to locations where a high join strength is required.

Note that, from the perspective of securing join strength at the join region 32, it is more preferable that the number of portions clinched from the panel side configured by material with a comparatively high Young's Modulus from out of the plural clinched portions 40 is not less than 90% of the total number of the plural clinched portions 40. However, this number may be set to from 60% to 80%, or may be set to from 50% to 60%, depending on the required join strength.

Second Exemplary Embodiment

Figure 2:
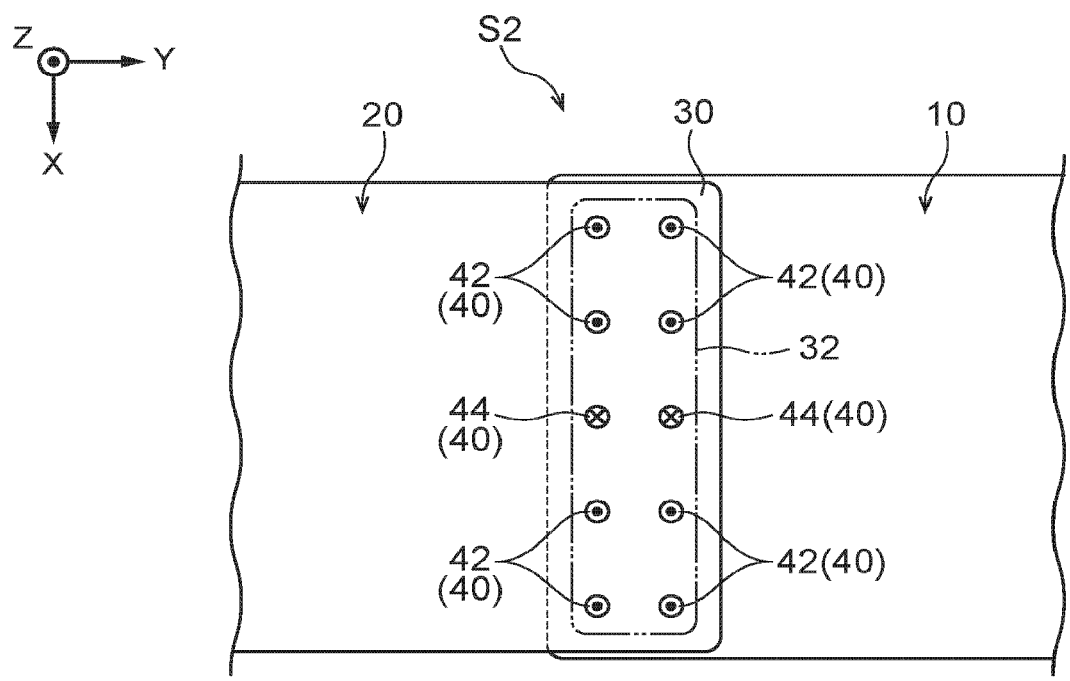
FIG. 2 is a plan view illustrating a joint structure of a second exemplary embodiment.

Explanation follows regarding a joint structure S2 of a second exemplary embodiment illustrated in FIG. 2.

Note that similar configuration to that in the first exemplary embodiment is appended with the same reference numerals in the drawings, and explanation thereof is omitted as appropriate.

FIG. 2 is a plan view in which the joint structure S2 is viewed from a direction orthogonal to the first panel 10 and the second panel 20. Note that in FIG. 2, the clinched portions 40 are schematically illustrated differently in order to distinguish between the standard clinched portions 42 and the reverse clinched portions 44.

As illustrated in FIG. 2, in the joint structure S2 there are plural (ten points in FIG. 2) clinched portions 40 formed so as to be arranged in two rows running along the length direction of the overlap region 30 (the X direction). The join region 32 is formed with its length direction along the X direction by the plural clinched portions 40 formed so as to be arranged in two rows. From out of the ten clinched portions 40, the two clinched portions 40 at the center in the length direction of the join region 32 (the X direction) are configured by reverse clinched portions 44, and the remaining clinched portions 40 are configured by standard clinched portions 42. The join region 32 is a region extending along the outer edges of the overlap region 30.

Operation and Advantageous Effects

Explanation follows regarding operation and advantageous effects of the present exemplary embodiment.

Note that explanation of operation and advantageous effects arising from similar configuration to that of the first exemplary embodiment is omitted as appropriate.

In the present exemplary embodiment, the clinched portions 40 are formed arranged in two rows in the elongated shaped join region 32. Since the clinched portions 40 are thereby formed arranged in plural rows in the elongated shaped join region 32, the join strength at the join region 32 can be made higher than in cases in which there is only a single row of clinched portions 40.

In the present exemplary embodiment, one clinched portion 40 from out of the five clinched portions 40 in one row of the two rows of clinched portions 40 is clinched from the second panel 20 side, this being the opposite side to the other four clinched portions 40, and one clinched portion 40 from out of the five clinched portions 40 in the other row is clinched from the second panel 20 side, this being the opposite side to the other four clinched portions 40. Namely, each row of clinched portions 40 in the plural rows of clinched portions 40 is configured including standard clinched portions 42 and a reverse clinched portion 44. Thus, an imbalance in warping in a direction orthogonal to length direction of the join region 32 (i.e. the Y direction) is not liable to occur.

Note however that a configuration may be adopted in which one row of clinched portions 40 from out of the two rows of clinched portions 40 is configured including both a standard clinched portion 42 and a reverse clinched portion 44, and the other row of clinched portions 40 is configured entirely of standard clinched portions 42.

Alternatively a configuration may be adopted in which one row of clinched portions 40 from out of the two rows of clinched portions 40 is configured entirely of standard clinched portions 42 and the other row of clinched portions 40 is configured entirely of reverse clinched portions 44. In such cases, the number of standard clinched portions 42 is the same as the number of other reverse clinched portions 44, i.e. five each. (In cases in which the numbers are the same, it is the clinched portions 40 clinched from the first panel 10 side configured by material with a comparatively high Young's Modulus that are referred to as standard clinched portions 42).

Third Exemplary Embodiment

Figure 3:
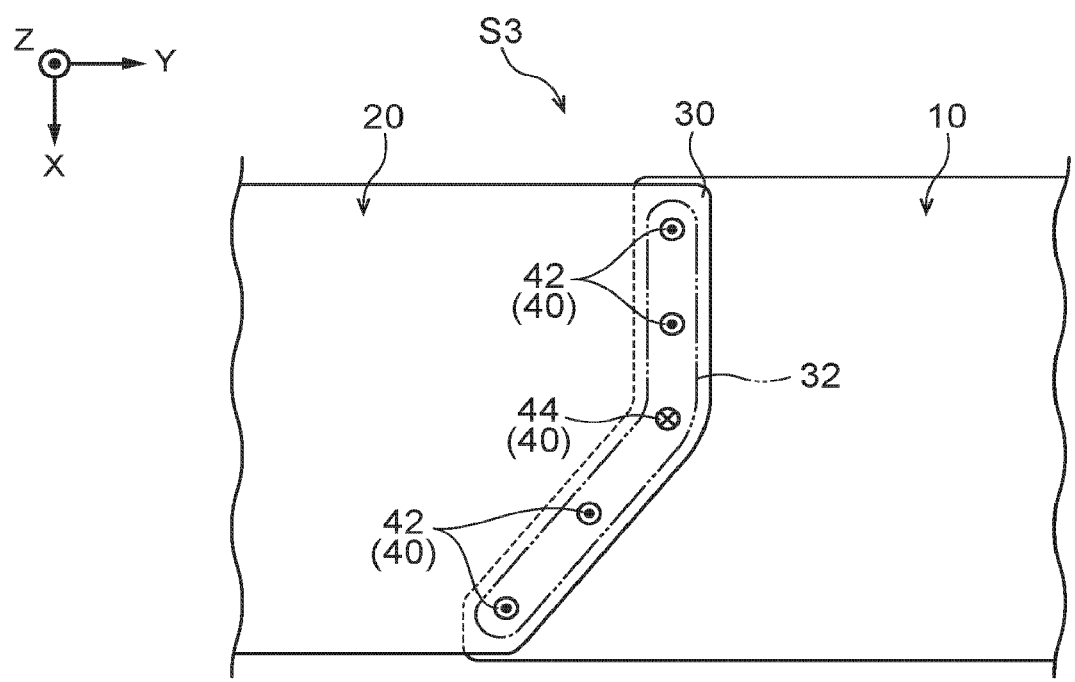
FIG. 3 is a plan view illustrating a joint structure of a third exemplary embodiment.

Explanation follows regarding a joint structure S3 of a third exemplary embodiment illustrated in FIG. 3.

Note that similar configuration to that in the first exemplary embodiment is appended with the same reference numerals in the drawings, and explanation thereof is omitted as appropriate.

In the joint structure S3, the length direction of the overlap region 30 is bent rather than being a straight line. The join region 32 is formed so as to extend along the overlap region 30. Thus, the length direction of the join region 32 is also bent. The join region 32 is hence configured by a region in which two regions extending in straight lines are connected together at a single inflection point. A reverse clinched portion 44 is formed at this connecting portion (the inflection point portion). The reverse clinched portion 44 is positioned at the middle of the plural (five) clinched portions 40, and the other clinched portions 40 are all standard clinched portions 42.

Operation and Advantageous Effects

Explanation follows regarding operation and advantageous effects of the present exemplary embodiment.

Note that explanation of operation and advantageous effects arising from similar configuration to the first exemplary embodiment is omitted as appropriate.

Warping of a member can also be reduced in cases in which the join region 32 is bent, as in the present exemplary embodiment, by configuring the plural clinched portions 40 so as to include the reverse clinched portion 44.

Moreover, in the present exemplary embodiment it is the clinched portion 40 at the portion of the join region 32 at the inflection point that is configured by the reverse clinched portion 44. There is accordingly a high degree of advantageous effect to reduce warping of the member. Moreover, the clinched portions 40 on the bent join region 32 located on the straight line portions are all configured by standard clinched portions 42. This enables the proportion of standard clinched portions 42 to be increased, enabling the join strength of the join region 32 as a whole to be increased.

Fourth Exemplary Embodiment

Figure 4:
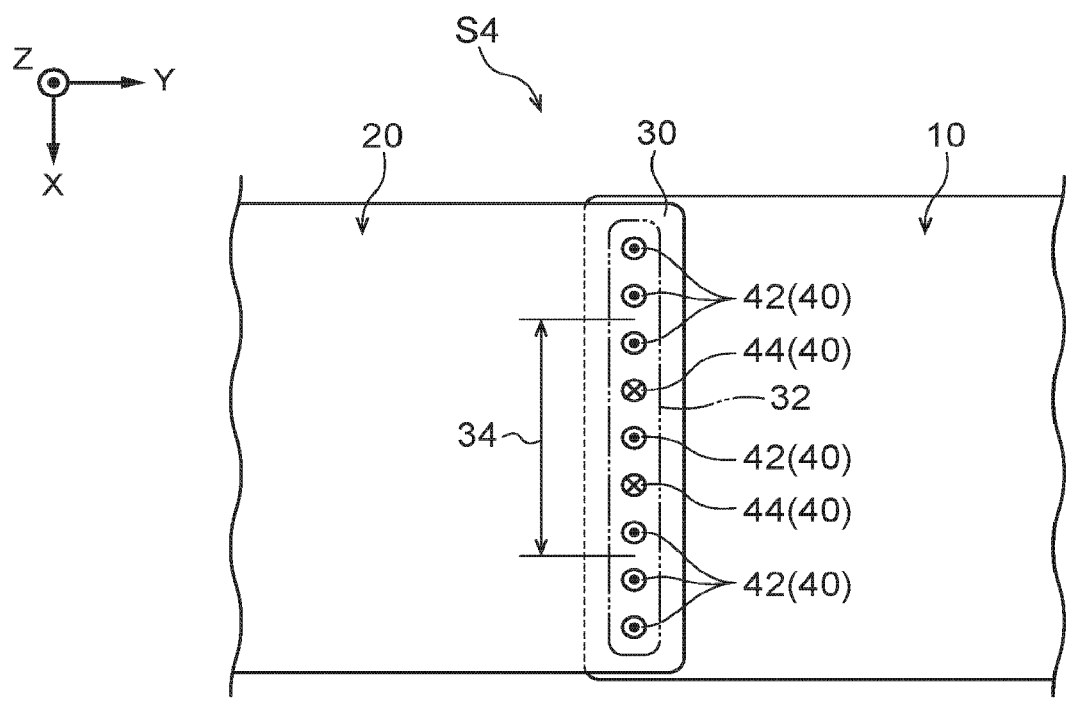
FIG. 4 is a plan view illustrating a joint structure of a fourth exemplary embodiment.

Explanation follows regarding a joint structure S4 of a fourth exemplary embodiment illustrated in FIG. 4.

Note that similar configuration to that in the first exemplary embodiment is appended with the same reference numerals in the drawings, and explanation thereof is omitted as appropriate.

In the joint structure S4, plural (nine) clinched portions 40 are formed arranged in a single row along the length direction (X direction) of an elongated shaped overlap region 30 extending along the X direction. The five clinched portions 40 at the center of the nine clinched portions 40 (namely, five consecutive clinched portions arranged in a row in the length direction of the join region 32 (the X direction)) are clinched from alternate directions. In other words, the join region 32 is configured to include an alternating region 34, in which the alternating region 34 is a region having five or more consecutive clinched portions arranged in a row in the length direction of the join region 32 that are clinched from alternate directions.

The clinched portions 40 in regions of the join region 32 other than the alternating region 34 are all standard clinched portions 42. There are accordingly seven standard clinched portions 42 and two reverse clinched portions 44 in the nine clinched portions 40.

Operation and Advantageous Effects

Explanation follows regarding operation and advantageous effects of the present exemplary embodiment.

Note that explanation of operation and advantageous effects arising from similar configuration to the first exemplary embodiment is omitted as appropriate.

In the present exemplary embodiment, the join region 32 includes the alternating region 34 having the five or more consecutive clinched portions 40 arranged in a row in the length direction of the join region 32 (the X direction) that are clinched from alternate directions. This enables warping of a member to be particularly suppressed at the alternating region 34 of the join region 32.

Fifth Exemplary Embodiment

Figure 5:
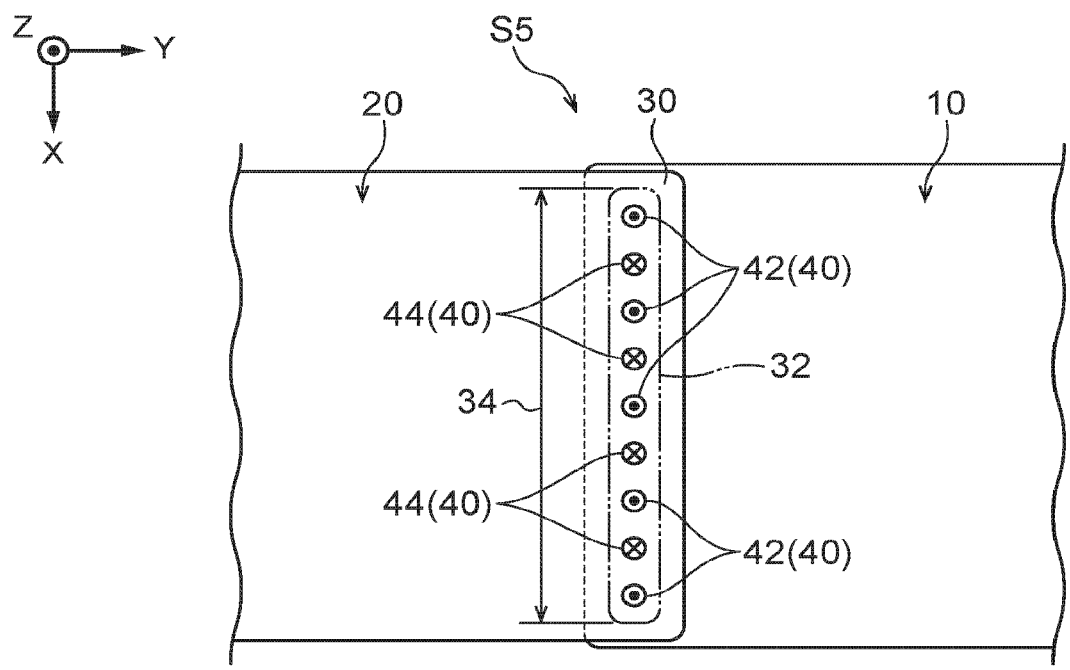
FIG. 5 is a plan view illustrating a joint structure of a fifth exemplary embodiment.

Explanation follows regarding a joint structure S5 of a fifth exemplary embodiment illustrated in FIG. 5.

Note that similar configuration to that in the first exemplary embodiment is appended with the same reference numerals in the drawings, and explanation thereof is omitted as appropriate.

As illustrated in FIG. 5, in the joint structure S5, nine clinched portions 40 are formed so as to be arranged in a row along the length direction of the overlap region 30 (X direction), and the join region 32 is formed extending along the X direction. The nine clinched portions 40 are formed arranged in a single row. The nine clinched portions 40 are clinched in alternate directions on progression along the arrangement direction. Namely, the join region 32 is configured by an alternating region 34 alone. Of the nine clinched portions 40, there are five clinched portions 42 clinched from the first panel 10 side configured by a material with a comparatively high Young's Modulus, this being greater than the number of clinched portions 44 (four) clinched from the second panel 20 side.

Operation and Advantageous Effects

Explanation follows regarding operation and advantageous effects of the present exemplary embodiment.

Note that explanation of operation and advantageous effects arising from similar configuration to the first exemplary embodiment is omitted as appropriate.

In the present exemplary embodiment, the join region 32 is configured by the alternating region 34 alone. Namely, the plural clinched portions 40 are clinched in alternate directions along the entire join region 32 when progressing along the length direction of the join region 32. Thus, a relationship arises in which the warping directions of adjacent clinched portions 40 cancel each other out, and warping is effectively suppressed from being generated along the entire elongated shaped join region 32.

In the present exemplary embodiment, there are nine clinched portions 40 formed so as to be arranged in a row along the join region 32. There are accordingly many clinched portions 40 formed so as to be arranged in a row in the join region 32, moreover the join region 32 is configured by the alternating region 34 alone, thereby enabling warping in the long join region 32 to be effectively reduced.

Sixth Exemplary Embodiment

Figure 6:
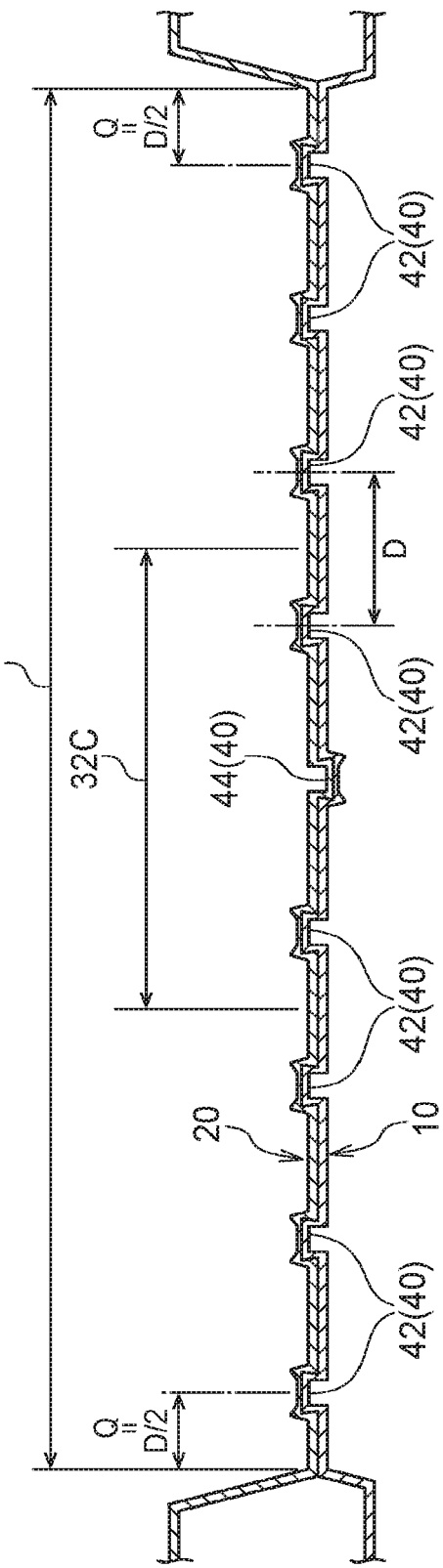
FIG. 6 is a cross-section illustrating a joint structure of a sixth exemplary embodiment.

Explanation follows regarding a joint structure S6 of a sixth exemplary embodiment illustrated in FIG. 6.

Note that similar configuration to that in the first exemplary embodiment is appended with the same reference numerals in the drawings, and explanation thereof is omitted as appropriate.

FIG. 6 is a cross-section in which the joint structure S6 is sectioned along the length direction of the join region 32 (which may be bent rather than being a straight line). As illustrated in FIG. 6, in the joint structure S6, nine clinched portions 40 are formed in the join region 32 so as to be arranged in a single row at substantially uniform spacings. A closed cross-section structure is formed by the first panel 10 and the second panel 20 on one length direction side of the join region 32 (the left side in FIG. 6), and a closed cross-section structure is also formed by the first panel 10 and the second panel 20 on the other length direction side of the join region 32 (the right side in FIG. 6). Both length direction sides of the join region 32 are thereby fixed ends.

There are eight standard clinched portions 42, which is more than the number of reverse clinched portions 44 (one). The reverse clinched portion 44 is the middle clinched portion 40 from out of the nine clinched portions 40. The reverse clinched portion 44 is thereby positioned in a central region (referred to below as a "central region 32C") making up 33% of the entire length, i.e. 100%, of the join region 32.

Note that the "entire length of the join region 32" is understood as follows. Namely, a position at one length direction end of the join region 32 is a position separated from, and further toward the one length direction side, than the clinched portion 40 furthest toward the one length direction side. A position at the other length direction end of the join region 32 is a position separated from, and further toward the other length direction side, than the clinched portion 40 furthest toward the other length direction side. Each of these separation distances Q is a distance (D/2) that is half the average distance D between adjacent clinched portions 40 (see FIG. 6).

In addition to the reverse clinched portion 44, standard clinched portions 42 are also formed in the central region 32C. The central clinched portion 40, from out of plural (three) clinched portions 40 formed so as to be arranged in a row in the central region 32C, is a reverse clinched portion 44. Moreover, there are no reverse clinched portions 44 formed in regions of the join region 32 other than the central region 32C, and only standard clinched portions 42 are formed therein.

Operation and Advantageous Effects

Explanation follows regarding operation and advantageous effects of the present exemplary embodiment.

Note that explanation of operation and advantageous effects arising from similar configuration to the first exemplary embodiment is omitted as appropriate.

In the present exemplary embodiment, the one and the other length direction sides of the join region 32 are both configured by fixed ends. In such cases, inverting the clinched portion 40 in the vicinity of the length direction center of the join region 32 is highly effective in reducing warping.

In the present exemplary embodiment, the reverse clinched portion 44 that is clinched from the second panel 20 side is present in the central region 32C of the join region 32. This enables warping of a member to be effectively reduced in cases in which it is desirable to have a large proportion of standard clinched portions 42 among the plural clinched portions 40 (such as, for example, cases in which it is desirable to increase the join strength when the first panel 10 is configured by a material with a comparatively high Young's Modulus, as in the present exemplary embodiment).

In the present exemplary embodiment, only the standard clinched portions 42 clinched from the first panel 10 side are present in the regions of the join region 32 excluding the central region 32C. Thus, there is a high proportion of standard clinched portions 42 among the plural clinched portions 40, and it is easy to increase the join strength and to reduce warping in accordance with the magnitude relationship of the Young's Moduli of the materials of the first panel 10 and the second panel 20.

Note that even in cases in which reverse clinched portions 44 are present in the regions of the join region 32 other than the central region 32C, as long as the proportion of reverse clinched portions 44 included in the central region 32C is greater than the proportion of reverse clinched portions 44 included in the regions other than the central region 32C, a certain degree of advantageous effect is exhibited from the perspective of improving join strength by increasing the proportion of standard clinched portions 42 and efficiently reducing warping by the position of the reverse clinched portions 44.

Note that in the above exemplary embodiment, an example has been given in which the one and the other length direction sides of the join region 32 are both fixed ends. However, inverting the clinched portion 40 in the vicinity of the length direction center of the join region is also highly effective in reducing warping in cases in which the one and the other length direction sides are both free ends. Thus, similar advantageous effects are exhibited in the above exemplary embodiment even for configurations in which both length direction sides of the join region 32 are modified to be configured by free ends.

Seventh Exemplary Embodiment

Figure 7:
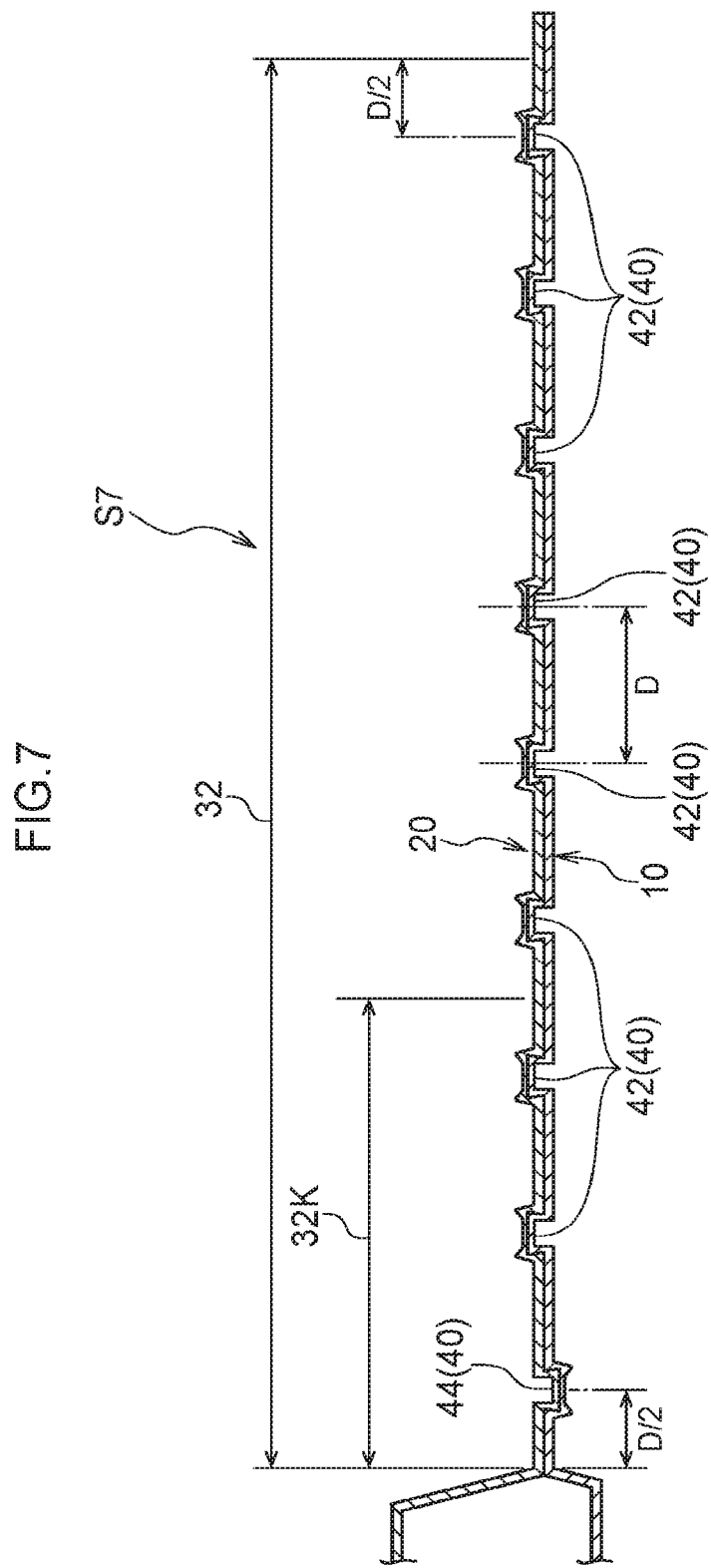
FIG. 7 is a cross-section illustrating a joint structure of a seventh exemplary embodiment.

Explanation follows regarding a joint structure S7 of a seventh exemplary embodiment illustrated in FIG. 7.

Note that similar configuration to that in the first exemplary embodiment is appended with the same reference numerals in the drawings, and explanation thereof is omitted as appropriate.

FIG. 7 is a cross-section in which the joint structure S7 is sectioned along the length direction of the join region 32 (which may be bent rather than being a straight line). As illustrated in FIG. 7, nine clinched portions 40 are formed arranged in a single row at substantially uniform spacings along the join region 32. A closed cross-section structure is formed by the first panel 10 and the second panel 20 on one length direction side of the join region 32 (the left side in FIG. 7), and end portions of the first panel 10 and the second panel 20 are positioned near to the other length direction side end of the join region 32 without forming a closed cross-section structure or the like on the other length direction side of the join region 32 (the right side in FIG. 7) Thus, the one length direction side of the join region 32 is configured by a fixed end and the other length direction side is configured by a free end.

There are eight standard clinched portions 42, which is more than the number of reverse clinched portions 44 (one). The reverse clinched portion 44 is the clinched portion 40 that is furthest toward the fixed end side out of the nine clinched portions 40. The reverse clinched portion 44 is thereby positioned in a region on the fixed end side (referred to below as a "fixed end region 32K") making up 33% of the entire length, i.e. 100%, of the join region 32. In addition to the reverse clinched portion 44, standard clinched portions 42 are also formed in the fixed end region 32K. There are three clinched portions 40 formed in the fixed end region 32K, with the clinched portion 40 that is furthest toward the fixed end side out of the plural (three) clinched portions 40 being the reverse clinched portion 44. There are no reverse clinched portions 44 formed in regions of the join region 32 other than the fixed end region 32K, and plural standard clinched portions 42 alone are formed therein.

Operation and Advantageous Effects

Explanation follows regarding operation and advantageous effects of the present exemplary embodiment.

Note that explanation of operation and advantageous effects arising from similar configuration to the first exemplary embodiment is omitted as appropriate.

In the present exemplary embodiment, one length direction side of the join region 32 is a fixed end, and the other length direction side thereof is a free end. In such cases, inverting the clinched portion 40 in the vicinity of the end portion on the fixed end side of the join region 32, this being the side furthest from the free end, is highly effective in reducing warping.

In the present exemplary embodiment, the reverse clinched portion 44 clinched from the second panel 20 side is present in the fixed end region 32K of the join region 32. This enables warping of a member to be effectively reduced in cases in which it is desirable to have a large proportion of standard clinched portions 42 among the plural clinched portions 40 (such as, for example, cases in which it is desirable to increase the join strength when the first panel 10 is configured by a material with a comparatively high Young's Modulus, as in the present exemplary embodiment).

In the present exemplary embodiment, only the standard clinched portions 42 clinched from the first panel 10 side are present in regions of the join region 32 excluding the fixed end region 32K. Thus, there is a high proportion of standard clinched portions 42 among the plural clinched portions 40, and it is easy to increase the join strength and to reduce warping in accordance with the magnitude relationship of the Young's Moduli of the materials of the first panel 10 and the second panel 20.

Note that even in cases in which reverse clinched portions 44 are present in regions of the join region 32 other than the fixed end region 32K, as long as the proportion of reverse clinched portions 44 included in the fixed end region 32K is greater than the proportion of reverse clinched portions 44 included in the regions other than the fixed end region 32K, a certain degree of advantageous effect is exhibited from the perspectives of improving join strength by increasing the proportion of standard clinched portions 42 and efficiently reducing warping by the positioning of the reverse clinched portions 44.

Supplementary Explanation of Above Exemplary Embodiments

Note that in the above exemplary embodiments, an example has been given in which the first panel 10 is a ferrous plate member and the second panel 20 is an aluminum plate member, such that the first panel 10 is configured by a material with a higher Young's Modulus than that of the second panel 20; however, the present disclosure is not limited thereto.

For example, configuration may be such that the first panel 10 is a ferrous plate member and the second panel 20 is a resin plate member (such as one made from fiber reinforced plastic or CFRP), such that the first panel 10 is configured by a material with a higher Young's Modulus than that of the second panel 20. Alternatively, for example, the first panel 10 may be an aluminum plate member, and the second panel 20 may be a fiber reinforced plastic plate member. Alternatively, the first panel 10 and the second panel 20 may both be plate members made of ferrous metal, may both be plate members made from aluminum, or may both be plate members made from fiber reinforced plastic. In such cases, there either may or may not be a difference in the Young's Moduli of the materials of the first panel 10 and the second panel 20.

In the above exemplary embodiments, an example has been given in which two panels, these being the first panel 10 and the second panel 20, are joined by mechanical clinching; however, the present disclosure is not limited thereto.

For example, another panel may be interposed between the first panel 10 and the second panel 20. In such cases also, basically the join strength at the clinched portions 40 is higher by clinching from the first panel 10 side with a higher Young's Modulus than by clinching from the second panel 20 side with a lower Young's Modulus. Moreover, warping is greater at clinched portions (join points) clinched from the first panel 10 side with a higher Young's Modulus than those clinched from the second panel 20 side with a lower Young's Modulus.

In the sixth exemplary embodiment, a region making up the central 33% of the entire length, i.e. 100%, of the join region 32 is considered to be the central region 32C. However, the configuration explained in the sixth exemplary embodiment may be adopted in cases in which a region making up the central 25% thereof is considered to be the central region 32C. The configuration explained in the sixth exemplary embodiment may also be adopted in cases in which a region making up the central 10% thereof is considered to be the central region 32C.

In the seventh exemplary embodiment, a region making up the fixed end side 33% of the entire length, i.e. 100%, of the join region 32 is considered to be the fixed end region 32K. However, the configuration explained in the seventh exemplary embodiment may be adopted in cases in which a region making up 25% on the fixed end side is considered to be the fixed end region 32K. The configuration explained in the seventh exemplary embodiment may also be adopted in cases in which a region making up 10% on the fixed end side is considered to be the fixed end region 32K.

Figure 8:
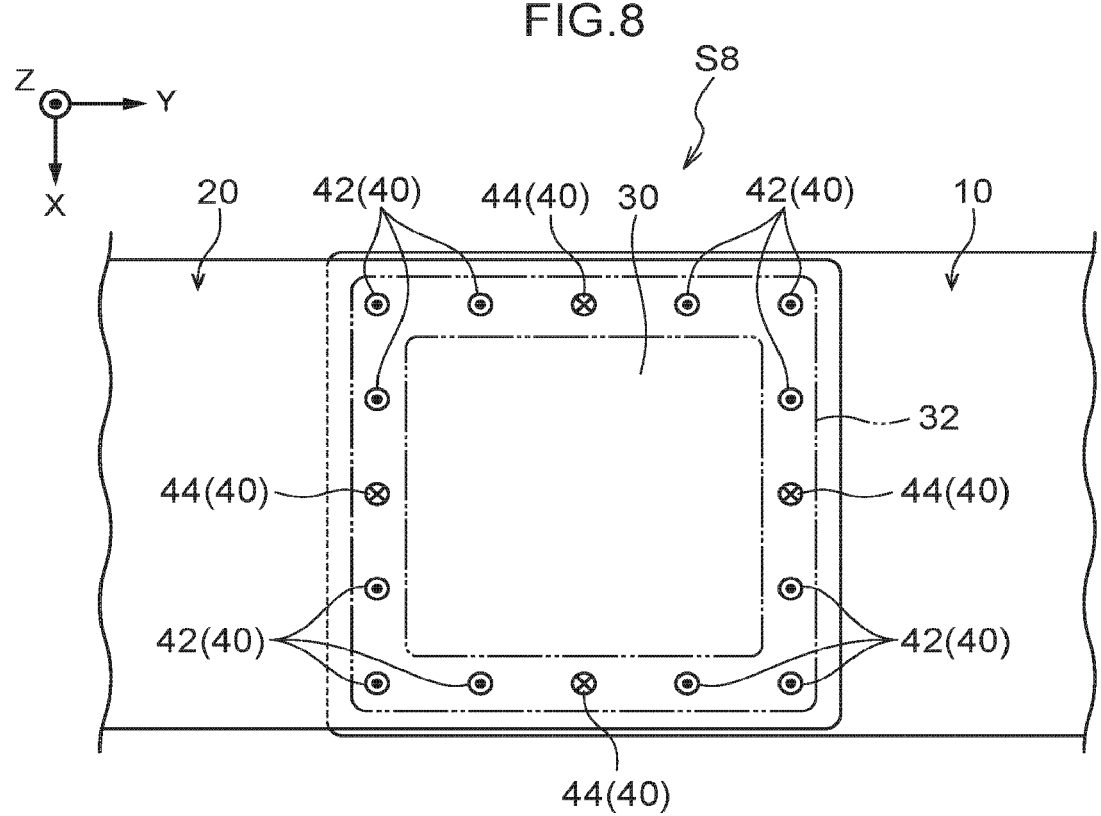
FIG. 8 is a plan view illustrating a joint structure of an eighth exemplary embodiment.
Figure 9:
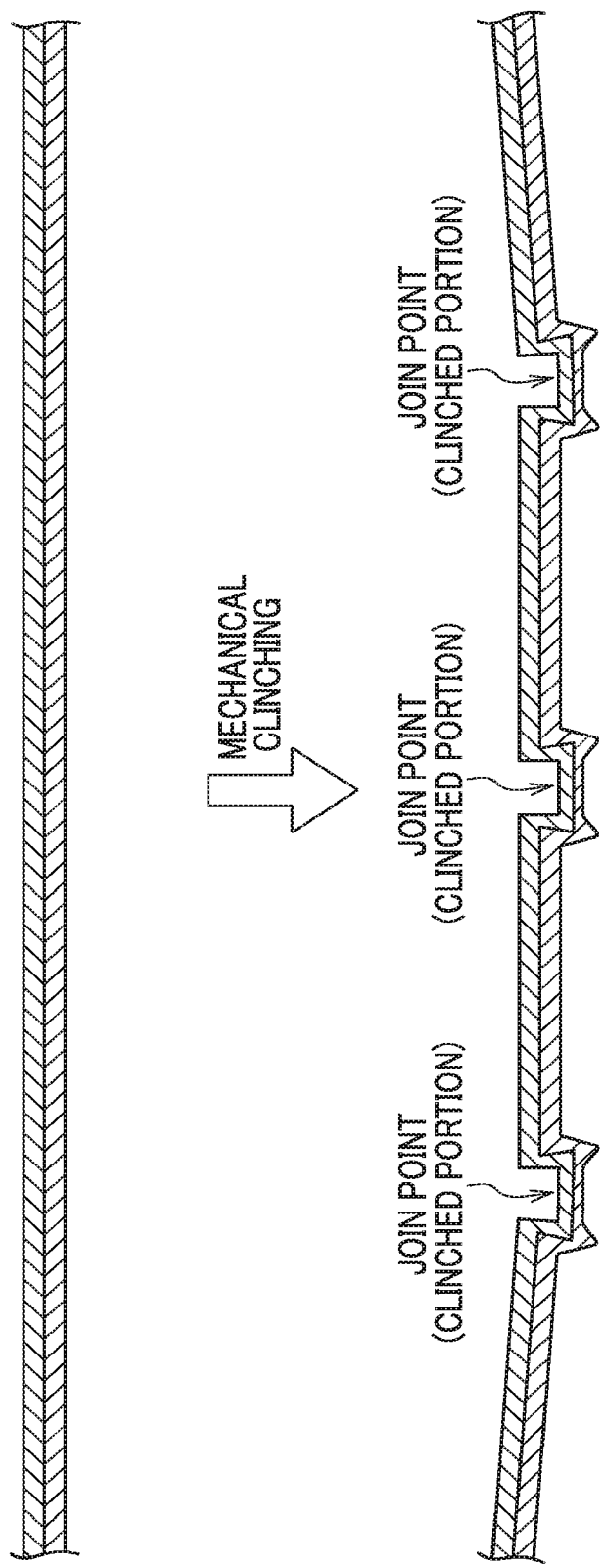
FIG. 9 are cross-sections illustrating cases in which joining is performed by mechanical clinching, emphasizing warping therein.

In the above exemplary embodiments, an example has been given in which the join region 32 is formed along the length direction of the overlap region 30; however, the present disclosure is not limited thereto. For example, a joint structure S8 of an eighth exemplary embodiment illustrated in FIG. 8 may be adopted.

In the joint structure S8, an overlap region 30 where a first panel 10 and a second panel 20 overlap each other is a substantially square shaped region, rather than being an elongated shaped region. Plural (sixteen in the drawing) clinched portions 42, 44 are formed along the outer edges of the overlap region 30. The join region 32 is formed along the outer edges of the overlap region 30 by the plural clinched portions 42, 44. Thus, the join region 32 extends in an elongated shape, while also being a closed region (namely, there is no concept of one and the other length direction ends for the joint structure S8 of the eighth exemplary embodiment). The join region 32 is a region extending in a rectangular shape, a reverse clinched portion 44 is formed at a central portion on each side of the rectangle, and standard clinched portions 42 are formed at other portions thereof.

What is claimed is:

1. A joint structure in which a first panel and a second panel are joined together by mechanical clinching, the joint structure comprising:
a join region that is formed so as to extend in an elongated shape by forming a plurality of clinched portions in a given arrangement by mechanical clinching, wherein:
at least one clinched portion of the plurality of clinched portions is clinched from an opposite panel side from other clinched portions of the plurality of clinched portions;
the first panel is configured by a material with a higher Young's Modulus than a material of the second panel;
among the plurality of clinched portions, a number of portions clinched from a first panel side is different than a number of portions clinched from a second panel side;
a number of the plurality of clinched portions is six or more; and
among the plurality of clinched portions, the number of portions clinched from the first panel side is no less than 60% of a total number of the plurality of clinched portions.

2. The joint structure of claim 1, wherein the join region comprises an alternating region at which five or more clinched portions consecutively arranged along a length direction of the join region are clinched in alternate directions.

3. The joint structure of claim 2, wherein the join region is configured by the alternating region alone.

4. A joint structure in which a first panel and a second panel are joined together by mechanical clinching, the joint structure comprising:
a join region that is formed so as to extend in an elongated shape by forming a plurality of clinched portions in a given arrangement by mechanical clinching, wherein:
at least one clinched portion of the plurality of clinched portions is clinched from an opposite panel side from other clinched portions of the plurality of clinched portions;
the first panel is configured by a material with a higher Young's Modulus than a material of the second panel;
among the plurality of clinched portions, a number of portions clinched from a first panel side is different than a number of portions clinched from a second panel side;
a number of the plurality of clinched portions is six or more; and
among the plurality of clinched portions, the number of portions clinched from the first panel side is no more than 40% of a total number of the plurality of clinched portions.

5. A joint structure in which a first panel and a second panel are joined together by mechanical clinching, the joint structure comprising:
a join region that is formed so as to extend in an elongated shape by forming a plurality of clinched portions in a given arrangement by mechanical clinching, wherein:
at least one clinched portion of the plurality of clinched portions is clinched from an opposite panel side from other clinched portions of the plurality of clinched portions;
the first panel is configured by a material with a higher Young's Modulus than a material of the second panel;
among the plurality of clinched portions, a number of portions clinched from a first panel side is different than a number of portions clinched from a second panel side;
among the plurality of clinched portions, the number of portions clinched from the first panel side is greater than the number of portions clinched from the second panel side;
respective length direction ends of the join region are either both free ends or both fixed ends;
a clinched portion clinched from the second panel side is present in a central region of the join region;
the central region is a region centered on a length direction center of the join region and consisting of 33% of the join region;
a number of the plurality of clinched portions is four or more, which are arranged in a longitudinal direction of the join region; and
only clinched portions clinched from the first panel side are present in regions of the join region other than the central region.

6. A joint structure in which a first panel and a second panel are joined together by mechanical clinching, the joint structure comprising:
- a join region that is formed so as to extend in an elongated shape by forming a plurality of clinched portions in a given arrangement by mechanical clinching, wherein:
- at least one clinched portion of the plurality of clinched portions is clinched from an opposite panel side from other clinched portions of the plurality of clinched portions;
- the first panel is configured by a material with a higher Young's Modulus than a material of the second panel;
- among the plurality of clinched portions, a number of portions clinched from a first panel side is different than a number of portions clinched from a second panel side;
- among the plurality of clinched portions, the number of portions clinched from the first panel side is greater than the number of portions clinched from the second panel side;
- one length direction side of the join region is a fixed end and another length direction side of the join region is a free end;
- a clinched portion clinched from the second panel side is present in a fixed end region of the join region;
- the fixed end region is a region consisting of 33% of the join region and extending from a fixed end side end portion of the join region along a length direction of the join region; and
- only clinched portions that are clinched from the first panel side are present in regions of the join region other than the fixed end region.

\* \* \* \* \*